US012719826B2

(12) United States Patent
Yamane et al.

(10) Patent No.: US 12,719,826 B2
(45) Date of Patent: Aug. 25, 2026

(54) RELAY DEVICE, RELAY METHOD AND STORAGE MEDIUM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Ryo Yamane, Osaka (JP); Tatsuya Izumi, Osaka (JP); Hideyuki Tanaka, Osaka (JP); Yusuke Yamamoto, Osaka (JP); Yoshio Ito, Osaka (JP); Kenta Ogata, Osaka (JP); Darmawan Go, Yokkaichi (JP); Yoshitaka Kikuchi, Yokkaichi (JP); Hirofumi Urayama, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 42 days.

(21) Appl. No.: 18/996,571

(22) PCT Filed: Apr. 27, 2023

(86) PCT No.: PCT/JP2023/016728

§ 371 (c)(1),
(2) Date: Jan. 17, 2025

(87) PCT Pub. No.: WO2024/024196

PCT Pub. Date: Feb. 1, 2024

(65) Prior Publication Data

US 2026/0025355 A1 Jan. 22, 2026

(30) Foreign Application Priority Data

Jul. 27, 2022 (JP) ................................ 2022-119354

(51) Int. Cl.
*G06F 15/173* (2006.01)
*H04L 25/20* (2006.01)
(Continued)

(52) U.S. Cl.
CPC .............. *H04L 61/09* (2022.05); *H04L 25/20* (2013.01); *H04L 67/12* (2013.01)

(58) Field of Classification Search
CPC . H04L 61/09; H04L 9/40; H04L 25/20; H04L 67/12; H04L 67/125; H04L 2012/40215; H04L 2012/40273
(Continued)

(56) References Cited

U.S. PATENT DOCUMENTS

2011/0149969 A1 6/2011 Beecroft et al.

FOREIGN PATENT DOCUMENTS

JP 2016-163245 A 9/2016
JP 2017-147695 A 8/2017
JP 2022-066959 A 5/2022

OTHER PUBLICATIONS

"Planet Networking & Communication, ""User's Manual: Industrial 8-Port 10/100/1000Mbps Managed Ethernet Switch, IGS-801M,"" Mar. 2016, [URL : http://www planet com tw/storage/ product s/256 85/ EM IGS 801M v2.1.pdf]."

(Continued)

*Primary Examiner* — Kaylee J Huang
(74) *Attorney, Agent, or Firm* — Oliff PLC

(57) ABSTRACT

A relay device that includes a processor that is configured to: monitor a state of the in-vehicle network; perform update processing of the correspondence information; switch (Continued)

between a stopped state in which the update processing is stopped and an execution state in which the update processing is executed, and to switch from the stopped state to the execution state when a change in the state of the in-vehicle network is detected; and save, in the memory, the correspondence information on which the update processing is performed in the execution state as the correspondence information to be used for the relay processing in the stopped state, when the processor switches from the execution state to the stopped state.

11 Claims, 8 Drawing Sheets

(51) Int. Cl.
*H04L 61/09* (2022.01)
*H04L 67/12* (2022.01)

(58) Field of Classification Search
USPC .......................................... 709/224, 223, 238
See application file for complete search history.

(56) References Cited

OTHER PUBLICATIONS

Huawei, "Mac Aging Time—Huawei S1700 Series Web User Manual," Oct. 25, 2012, [URL: https:// www. manualslib. com/ manual/966836/Huawei-S1700-Series.html?page=60#manual].

Jul. 4, 2023 International Search Report issued in International Patent Application No. PCT/JP2023/016728.

Ta

| RELAY DEVICE 101A | | |
|---|---|---|
| CORRESPONDENCE RELATIONSHIP | | DISTINCTION INFORMATION |
| DESTINATION MAC ADDRESS | PORT NUMBER | |
| MAC-A | #1 | STOPPED |
| MAC-B | #4 | STOPPED |

Tb

| RELAY DEVICE 101B | | |
|---|---|---|
| CORRESPONDENCE RELATIONSHIP | | DISTINCTION INFORMATION |
| DESTINATION MAC ADDRESS | PORT NUMBER | |
| MAC-A | #1 | STOPPED |
| MAC-B | #2 | STOPPED |

Tc

| RELAY DEVICE 101C | | |
|---|---|---|
| CORRESPONDENCE RELATIONSHIP | | DISTINCTION INFORMATION |
| DESTINATION MAC ADDRESS | PORT NUMBER | |
| MAC-A | #1 | STOPPED |
| MAC-B | #1 | STOPPED |

| RELAY DEVICE 101A | | |
|---|---|---|
| CORRESPONDENCE RELATIONSHIP | | DISTINCTION INFORMATION |
| DESTINATION MAC ADDRESS | PORT NUMBER | |
| MAC-A | #1 | STOPPED |
| MAC-B | #4 | STOPPED |
| MAC-C | #3 | EXECUTION |

Tb

| RELAY DEVICE 101B | | |
|---|---|---|
| CORRESPONDENCE RELATIONSHIP | | DISTINCTION INFORMATION |
| DESTINATION MAC ADDRESS | PORT NUMBER | |
| MAC-A | #1 | STOPPED |
| MAC-B | #2 | STOPPED |
| MAC-C | #1 | EXECUTION |

Tc

| RELAY DEVICE 101C | | |
|---|---|---|
| CORRESPONDENCE RELATIONSHIP | | DISTINCTION INFORMATION |
| DESTINATION MAC ADDRESS | PORT NUMBER | |
| MAC-A | #1 | STOPPED |
| MAC-B | #1 | STOPPED |
| MAC-C | #3 | EXECUTION |

| RELAY DEVICE 101C | | |
|---|---|---|
| CORRESPONDENCE RELATIONSHIP | | DISTINCTION INFORMATION |
| DESTINATION MAC ADDRESS | PORT NUMBER | |
| MAC-A | #1 | STOPPED |
| MAC-B | #1 | STOPPED |
| MAC-C | #3 | STOPPED |

FIG. 7

RELAY DEVICE, RELAY METHOD AND STORAGE MEDIUM

BACKGROUND

The present disclosure relates to a relay device, a relay method, and a storage medium.

This application claims priority to Japanese Application No. 2022-119354, filed on Jul. 27, 2022, the entire disclosure of which is hereby incorporated herein by reference.

User's Manual of IGS-801M 4.11.4 Dynamic Learned, March 2016, PLANET Networking & Communication, retrieved on Jun. 6, 2022 from the Internet <URL: http://www.planet.com.tw/storage/products/25685/EM-IGS-801M_v2.1.pdf> (Non-Patent Document 1), and S1700 Managed Series Ethernet Switches V100R007C00 Web User Manual, Oct. 25, 2012, [online], HUAWEI, retrieved on Jun. 6, 2022 from the Internet <URL: https://www.manualslib.com/manual/966836/Huawei-S1700-Series.html?page=60#manual> (Non-Patent Document 2) each disclose a relay device that updates an address table using a Media Access Control (MAC) and relays a frame using the updated MAC address table.

SUMMARY

A relay device according to the present disclosure is a relay device configured to perform relay processing of a frame between a plurality of functional units in an in-vehicle network, the relay device including: a plurality of communication ports; a storage unit configured to store correspondence information that is used for the relay processing and indicates a correspondence relationship between a destination MAC address included in the frame and the communication ports; a state monitoring unit configured to monitor a state of the in-vehicle network; an update unit configured to perform update processing of the correspondence information; a switching unit configured to switch between a stopped state in which the update processing is stopped and an execution state in which the update processing is executed, and to switch from the stopped state to the execution state when a change in the state of the in-vehicle network is detected by the state monitoring unit; and a saving unit configured to save, in the storage unit, the correspondence information on which the update processing is performed in the execution state as the correspondence information to be used for the relay processing in the stopped state, when the switching unit switches from the execution state to the stopped state.

An aspect of the present disclosure may be realized not only as a relay device provided with such a characteristic processing unit, but also as a semiconductor integrated circuit that realizes part or the entirety of the relay device, or as a system including the relay device.

BRIEF DESCRIPTION OF THE DRAWINGS

FIG. 4 is a diagram showing an example of tables held by relay devices in the in-vehicle communication system according to the embodiment of the present disclosure.

FIG. 6 is a diagram showing an example of tables in an execution state of the in-vehicle communication system according to the embodiment of the present disclosure.

FIG. 7 is a diagram showing an example of tables after switching the in-vehicle communication system according to the embodiment of the present disclosure to a stopped state.

DETAILED DESCRIPTION OF EMBODIMENTS

Figure 1:
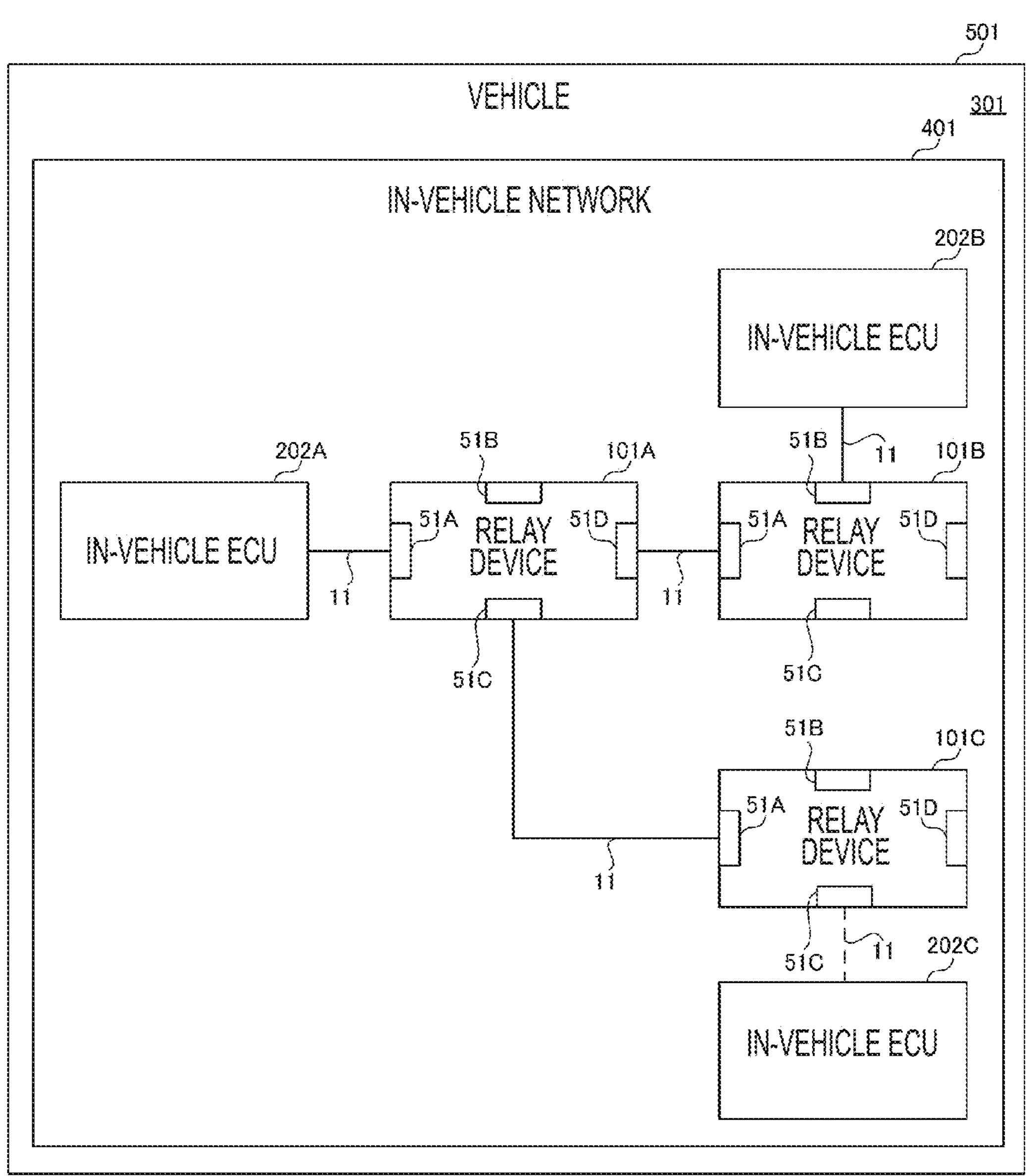
FIG. 1 is a diagram showing an example of the configuration of an in-vehicle communication system according to an embodiment of the present disclosure.

Conventionally, in the Ethernet (registered trademark), a technique for updating a MAC address table indicating a correspondence relationship between a destination MAC address and a communication port is known.

Problems Solved by Disclosure

In a relay device, since the content of the MAC address table in which there has been no communication for a certain period of time is reset, flooding may occur in which a unicast frame received at one communication port is output from all the communication ports other than that one communication port. In particular, since resources are limited in an in-vehicle network, the influence of flooding on the relay device is significant.

The present disclosure has been made in order to solve the above problems, and an object thereof is to provide a relay device, a relay method, and a relay program that are capable of reducing the communication load in an in-vehicle network.

Effects of Disclosure

According to the present disclosure, it is possible to reduce the communication load in an in-vehicle network.

Description of Embodiments of Present Disclosure

First, embodiments of the present disclosure will be listed and described.

(1) A relay device according to an embodiment of the present disclosure is a relay device configured to perform relay processing of a frame between a plurality of functional units in an in-vehicle network, the relay device including: a plurality of communication ports; a storage unit configured to store correspondence information that is used for the relay processing and indicates a correspondence relationship between a destination MAC address included in the frame and the communication ports; a state monitoring unit configured to monitor a state of the in-vehicle network; an update unit configured to perform update processing of the correspondence information; a switching unit configured to switch between a stopped state in which the update processing is stopped and an execution state in which the update processing is executed, and to switch from the stopped state to the execution state when a change in the state of the in-vehicle network is detected by the state monitoring unit; and a saving unit configured to save, in the storage unit, the correspondence information on which the update processing is performed in the execution state as the correspondence information to be used for the relay processing in the stopped state, when the switching unit switches from the execution state to the stopped state.

In this manner, with a configuration in which the in-vehicle network is switched to the execution state when a change has occurred in the in-vehicle network, the correspondence information that was updated in the execution state is saved and used in the relay processing in the stopped state, it is possible to suppress the occurrence of flooding in the in-vehicle network while updating the correspondence information at appropriate timings. It is thus possible to reduce the communication load in the in-vehicle network.

(2) In the above (1), the change may also be addition of a functional unit to the in-vehicle network.

With this configuration, it is possible to update the correspondence information at a timing at which a new in-vehicle network is established, and which is appropriate as the update timing.

(3) In the above (1) or (2), the switching unit may switch from the execution state to the stopped state when a predetermined period of time has elapsed after switching to the execution state.

With this configuration, it is possible to determine the timing to switch from the execution state to the stopped state with simple processing.

(4) In any one of the above (1) to (3), a configuration is also possible in which the state monitoring unit detects the change due to the functional unit, and the update unit performs the update processing based on a predetermined frame transmitted from the functional unit that caused the change.

With this configuration, for example, it is possible to update the correspondence information using the frame compliant with the existing protocol transmitted by the functional unit that has caused the change in the state of the in-vehicle network to establish the communication connection with another functional unit. Accordingly, it is possible to perform update processing of the correspondence information while realizing Quality of Service (QoS) processing in which transmission of a frame with a higher priority is prioritized.

(5) A relay method according to the embodiment of the present disclosure is a relay method in a relay device to be performed by a relay device configured to perform relay processing of a frame between a plurality of functional units in an in-vehicle network and including a plurality of communication ports and a storage unit configured to store correspondence information that is used for the relay processing and indicates a correspondence relationship between a destination MAC address included in the frame and the communication ports, the method including: a step of monitoring a state of the in-vehicle network; a step of switching between a stopped state in which the update processing is stopped and an execution state in which the update processing is executed, when a change in the state of the in-vehicle network is detected; a step of performing the update processing in the execution state; and a step of saving, in the storage unit, the correspondence information on which the update processing is performed in the execution state, as correspondence information to be used for the relay processing in the stopped state, when the switching unit switches from the execution state to the stopped state).

In this manner, with the configuration in which the in-vehicle network is switched to the execution state when a change has occurred in the state of the in-vehicle network, and the correspondence information that was updated in the execution state is saved and used in the relay processing in the stopped state, it is possible to suppress the occurrence of flooding in the in-vehicle network while updating the correspondence information at appropriate timings. It is thus possible to reduce the communication load in the in-vehicle network.

A relay program according to an embodiment of the present disclosure is a relay program to be used in a relay device configured to perform relay processing of a frame between a plurality of functional units in an in-vehicle network and including a plurality of communication ports and a storage unit configured to store correspondence information that is used for the relay processing and indicates a correspondence relationship between a destination MAC address included in the frame and the communication port, the relay program causing a computer to function as: a state monitoring unit configured to monitor a state of the in-vehicle network; an update unit configured to perform update processing of the correspondence information; a switching unit configured to switch between a stopped state in which the update processing is stopped and an execution state in which the update processing is executed, and to switch from the stopped state to the execution state when a change in the state of the in-vehicle network is detected by the state monitoring unit; and a saving unit configured to store, in the storage unit, the correspondence information on which the update processing is performed in the execution state, as the correspondence information to be used for the relay processing in the stopped state, when the switching unit switches from the execution state to the stopped state.

In this manner, with a configuration in which the in-vehicle network is switched to the execution state when a change has occurred in the state of the in-vehicle network, the correspondence information that was updated in the execution state is saved and used in the relay processing in the stopped state, it is possible to suppress the occurrence of flooding in the in-vehicle network while updating the correspondence information at appropriate timings. It is thus possible to reduce the communication load in the in-vehicle network.

Hereinafter, embodiments of the present disclosure will be described using the drawings. Note that in the drawings, the same or corresponding portions are given the same reference numerals and the descriptions thereof will not be repeated. The embodiments described below may be at least partially combined with each other as desired.

Configuration of In-Vehicle Communication System

FIG. 1 is a diagram showing an example of the configuration of an in-vehicle communication system according to an embodiment of the present disclosure.

Referring to FIG. 1, an in-vehicle communication system 301 is mounted in a vehicle 501. The in-vehicle communication system 301 includes, for example, one or a plurality of in-vehicle Electronic Control Units (ECUs) 202 and one or a plurality of relay devices 101.

In FIG. 1, the in-vehicle communication system 301 includes in-vehicle ECUs 202, namely, 202A, 202B, and 202C, and relay devices 101, namely, 101A, 101B, and 101C. The in-vehicle ECUs 202 are examples of functional units.

Note that the in-vehicle communication system 301 is not limited to a configuration including three in-vehicle ECUs 202, and may be any configuration as long as one or more in-vehicle ECUs 202 are included. Also, the in-vehicle communication system 301 is not limited to a configuration including three relay devices 101, and may be any configuration as long as one or more relay devices 101 are included.

The in-vehicle ECUs 202 are devices such as automatic driving ECUs, sensors, navigation devices, Telematics Communication Units (TCU), Human-machine interfaces, and cameras.

The in-vehicle ECUs 202 and the relay devices 101 constitute an in-vehicle network 401. In the in-vehicle network 401, the in-vehicle ECUs 202 are connected to the relay devices 101 via Ethernet cables 11, for example.

The in-vehicle ECUs 202 and the relay-devices 101 are connected to other in-vehicle ECUs 202 or other relay devices 101 via the Ethernet cables 11 and communication ports 51 (described later).

The relay devices 101 are gateway devices, for example. The relay devices 101 can perform relay processing according to a layer 2 and a layer 3 that is higher than the layer 2, for example.

Information is exchanged between the in-vehicle ECUs 202 and the relay devices 101 using an Ethernet frame (hereinafter also simply referred to as a "frame") compliant with Ethernet communication standards, for example.

Note that the in-vehicle communication system 301 is not limited to a configuration in which frame relay processing is performed in compliance with Ethernet communication standards, and may be a configuration in which relay processing is performed in compliance with other communication standards.

The relay devices 101 performs frame relay processing between the plurality of in-vehicle ECUs 202 in the in-vehicle network 401. More specifically, the relay devices 101 each transmit a frame received from an in-vehicle ECU 202 to another in-vehicle ECU 202 of the destination.

Hereinafter, a functional unit that is newly added to the in-vehicle network 401 is also referred to as a "new functional unit". Also, the in-vehicle network 401 including the new functional unit is also referred to as a "new network", and the in-vehicle network 401 before adding the new functional unit is also referred to as an "existing network". Further, the functional unit included in the existing network is also referred to as an "existing functional unit".

In FIG. 1, the in-vehicle ECU 202C is an example of the new functional unit, and the in-vehicle ECUs 202A and 202B are examples of the existing functional units. Also, FIG. 1 shows the existing network in which the in-vehicle ECU 202C and the relay device 101C are not connected.

Configuration of Relay Device

Figure 2:
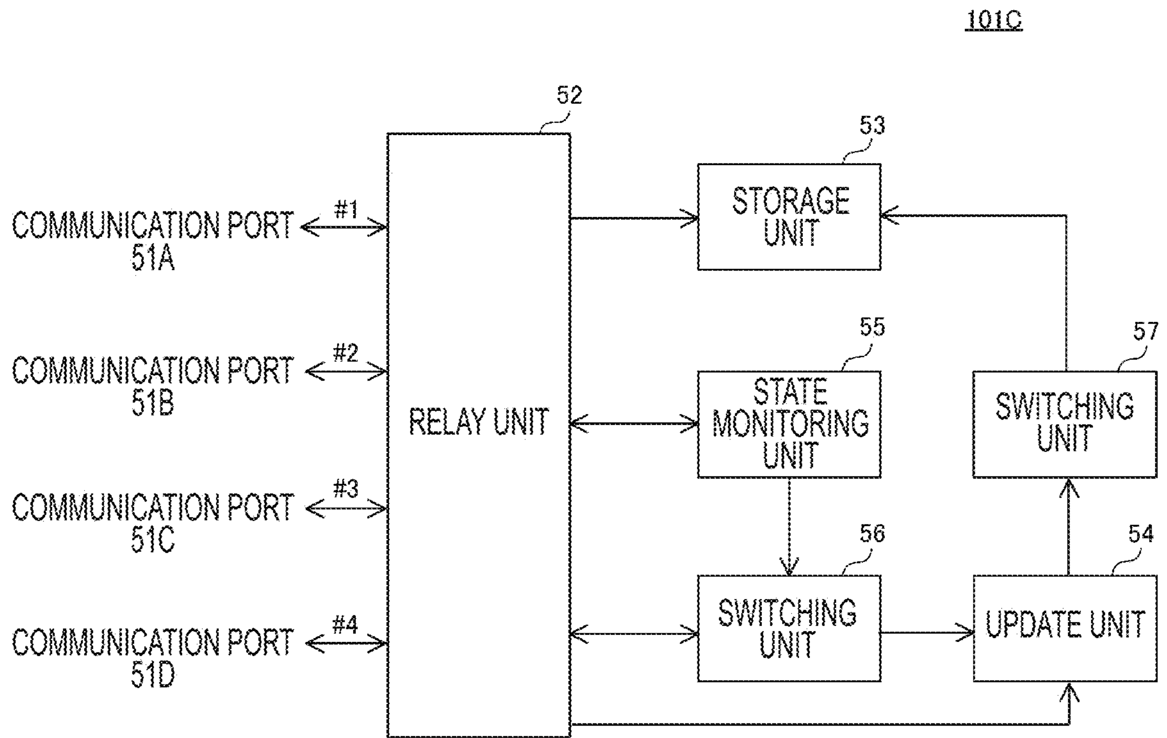
FIG. 2 is a diagram showing an example of the configuration of a relay device according to the embodiment of the present disclosure.

FIG. 2 is a block diagram showing an example of the configuration of the relay device according to the embodiment of the present disclosure. FIG. 2 shows the configuration of the relay device 101C. The configurations of the relay devices 101A and 101B are the same as that of the relay device 101C.

Referring to FIGS. 1 and 2, the relay devices 101 each have a plurality of communication ports 51, a relay unit 52, a storage unit 53 (memory), an update unit 54, a state monitoring unit 55, a switching unit 56, and a saving unit 57.

Some or all of the relay unit 52, the update unit 54, the state monitoring unit 55, the switching unit 56, and the saving unit 57 are realized by a processing circuit (circuitry) including one or a plurality of processors, for example. The storage unit 53 is, for example, a non-volatile memory included in the processing circuit.

The communication ports 51 are terminals to which the Ethernet cables 11 can be connected. The communication ports 51 are connected to the in-vehicle ECUs 202 via the Ethernet cables 11.

In the examples shown in FIGS. 1 and 2, the relay devices 101C include four communication ports 51A, 51B, 51C, and 51D, which are the communication ports 51. In the relay device 101C, the communication port 51A is connected to the relay device 101A via an Ethernet cable 11, and the communication port 51C is connected to the in-vehicle ECU 202C via an Ethernet cable 11.

The relay device 101C is not limited to the configuration including the four communication ports 51, and may have any configuration as long as two or more communication ports 51 are included.

The relay unit 52 includes, for example, a plurality of terminals (not shown) respectively connected to the plurality of communication ports 51. A unique port number is assigned to each terminal.

Here, the port numbers of the terminals respectively connected to the communication ports 51A, 51B, 51C, and 51D are #1, #2, #3, and #4.

The relay unit 52 receives the frames transmitted from the in-vehicle ECUs 202 or the other relay devices 101 via the communication ports 51 and outputs the frames to the other units.

The relay unit 52 transmits the frames received from the other units to the destination in-vehicle ECUs 202 or the other relay devices 101 via the communication ports 51.

Figure 3:
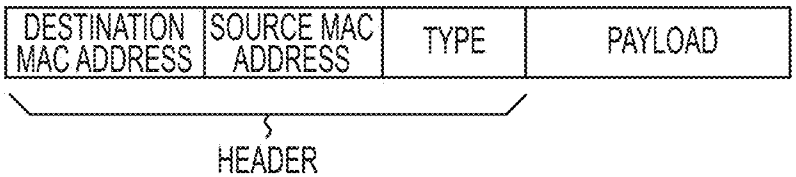
FIG. 3 is a diagram showing an example of a frame transferred in the in-vehicle communication system according to the embodiment of the present disclosure.

FIG. 3 is a diagram showing an example of a frame transferred in the in-vehicle communication system according to the embodiment of the present disclosure.

Referring to FIG. 3, a frame includes a header and a payload.

The header stores, for example, a destination MAC address, a source MAC address, and a type. The payload stores a destination IP address and various kinds of information.

Here, the MAC addresses of the in-vehicle ECUs 202A, 202B, and 202C are "MAC-A", "MAC-B", and "MAC-C", respectively.

Referring to FIG. 2 again, the storage unit 53 stores a MAC address table used in relay processing (hereinafter also referred to as a "table T"). The table T shows the correspondence relationship between the destination MAC address included in the frames and the communication port 51. The table T is an example of the correspondence information.

More specifically, the table T shows the correspondence relationship between the MAC address of the in-vehicle ECUs 202 of the destination of the frame and the port number of the terminal to be connected to the in-vehicle ECU 202.

FIG. 4 is a diagram showing examples of a table held by each relay device in the in-vehicle communication system according to the embodiment of the present disclosure.

Referring to FIG. 4, a table Ta is a table T saved in the storage unit 53 of the relay device 101A in the existing network. A table Tb is a table T in the storage unit 53 in the relay device 101B in the existing network. A table Tc is the table T in the storage unit 53 in the relay device 101C in the existing network.

For example, in the table Ta, the destination MAC address "MAC-A" and the port number "#1" are associated with each other, and the destination MAC address "MAC-B" and the port number "#4" are associated with each other. In the table Tb, the destination MAC address "MAC-A" is associated with the port number "#1", and the destination MAC address "MAC-B" is associated with the port number "#2". In the table Tc, the destination MAC address "MAC-A" and the port number "#1" are associated with each other, and the destination MAC address "MAC-B" and the port number "#1" are associated with each other. Note that "distinction information" shown in FIG. 4 will be described later.

Referring to FIGS. 2 and 4, the relay unit 52 in each relay device 101 relays the frame transmitted and received between the in-vehicle ECUs 202.

More specifically, the relay unit 52 refers to the table T stored in the storage unit 53 and specifies the port number corresponding to the destination MAC address included in the received frame. Then, the relay unit 52 transmits the received frame to the destination in-vehicle ECU 202 from the communication port 51 corresponding to the specified port number.

For example, when the relay unit 52 in the relay device 101C receives a frame addressed to the in-vehicle ECU 202A, that is, a frame including the destination MAC Address "MAC-A", the relay unit 52 refers to the table Tc illustrated in FIG. 4 and specifies the port No. "#1" corresponding to the destination MAC Address "MAC-A". Then, the relay device 101C transmits the frame to the in-vehicle ECU 202A from the communication port 51A.

Note that the functions of the update unit 54, the state monitoring unit 55, the switching unit 56 and the saving unit 57 will be described later.

Description of the Problem

Incidentally, a consumer relay device that performs relay processing using a MAC address table is known. Non-Patent Document 1 and Non-Patent Document 2 described above disclose a technique of displaying a dynamic MAC address table, which is a MAC address table updated by a relay device, on a screen. In addition, Non-Patent Document 1 and Non-Patent Document 2 described above disclose a technique in which a user saves a dynamic table displayed on a screen as a static MAC address table which is a table used for relay processing when updating is stopped.

However, in the relay device 101, since an entry, that is, the correspondence relationship, (?) in which there is no communication for a certain period of time in the table Tis reset, flooding may occur. Here, "flooding" means that a unicast frame received at a certain communication port 51 is output from all the communication ports 51 other than that communication port 51. Since resources are limited in the in-vehicle network 401, the influence of flooding on the relay device 101 is significant.

In view of this, the relay device according to the embodiment of the present disclosure solves the above-described problem by the following configuration and operation.

Configuration of Relay Device

Referring to FIG. 2 again, the state monitoring unit 55 in the relay device 101C monitors the state of the in-vehicle network 401. More specifically, for example, the state monitoring unit 55 detects the change in the state of the in-vehicle network 401 due to the in-vehicle ECUs 202. Here, the state monitoring unit 55 detects, as the state of the in-vehicle network 401, addition of a new functional unit, that is, the addition of the in-vehicle ECU 202C, to the in-vehicle network 401.

For example, the in-vehicle ECU 202C transmits, to the relay device 101C, the connection request information for requesting the communication connection in the in-vehicle network 401.

The relay unit 52 in the relay device 101C outputs, to the state monitoring unit 55, the connection request information received from the in-vehicle ECU 202C.

Upon receiving the connection request information from the relay unit 52, the state monitoring unit 55 detects the source in-vehicle ECU 202C of the connection request information.

More specifically, the state monitoring unit 55 receives a frame including the connection request information from the in-vehicle ECU 202C via the relay unit 52, and performs authentication processing of the in-vehicle ECU 202C by using the ID included in the frame and the authentication password.

When the in-vehicle ECU 202C is successfully authenticated, the state monitoring unit 55 transmits the frame including authentication-success information indicating that the in-vehicle ECU 202C was successfully authenticated to the in-vehicle ECU 202C via the relay unit 52.

The state monitoring unit 55 may be configured to periodically broadcast a search message for detecting a new functional unit via the relay unit 52, for example. In this case, the new functional unit receives the above search message and transmits the above connection request information as a response to the received search message.

Also, the state monitoring unit 55 is not limited to a configuration that detects addition of a new functional unit to the in-vehicle network 401 as a change in the state of the in-vehicle network 401, and may detect a change in the communication port 51 to which an existing functional unit is connected, or may detect some other event in the in-vehicle network 401.

The update unit 54 performs update processing of the above table T (hereinafter also referred to as "table update processing"). More specifically, the update unit 54 switches between a stopped state in which the table update processing is stopped and an execution state in which the table update processing is executed, under the later-described control of the switching unit 56.

The switching unit 56 switches between the stopped state and the execution state. Specifically, when the state monitoring unit 55 detects a change in the state of the in-vehicle network 401, the switching unit 56 switches from the stopped state to the execution state. Here, when the state monitoring unit 55 detects addition of a new functional unit to the in-vehicle network 401, the switching unit 56 switches from the stopped state to the execution state.

Specifically, when the in-vehicle ECU 202C is successfully authenticated, the state monitoring unit 55 outputs, to the switching unit 56, a switching request notification for requesting switching from the stopped state to the execution state. Upon receiving the switching request notification from the state monitoring unit 55, the switching unit 56 switches from the stopped state to the execution state.

The state monitoring unit 55 in the relay device 101C transmits the switching request notification to the relay devices 101A and 101B via the relay unit 52. The relay units 52 in the relay devices 101A and 101B output the switching request notification received from the relay device 101C to the switching unit 56. When upon receiving the switching request notification from the relay unit 52, the switching unit 56 in each of the relay devices 101A and 101B switches from the stopped state to the execution state. As a result, all the relay devices 101 of the in-vehicle network 401 can be switched to the execution state.

In the execution state, the update unit 54 performs table update processing based on a predetermined frame (hereinafter also referred to as a "frame F") transmitted from an in-vehicle ECU 202C that caused the change in the state of the in-vehicle network 401. For example, the update unit 54 performs the table update processing based on the frame F transmitted from the in-vehicle ECU 202C.

Figure 5:
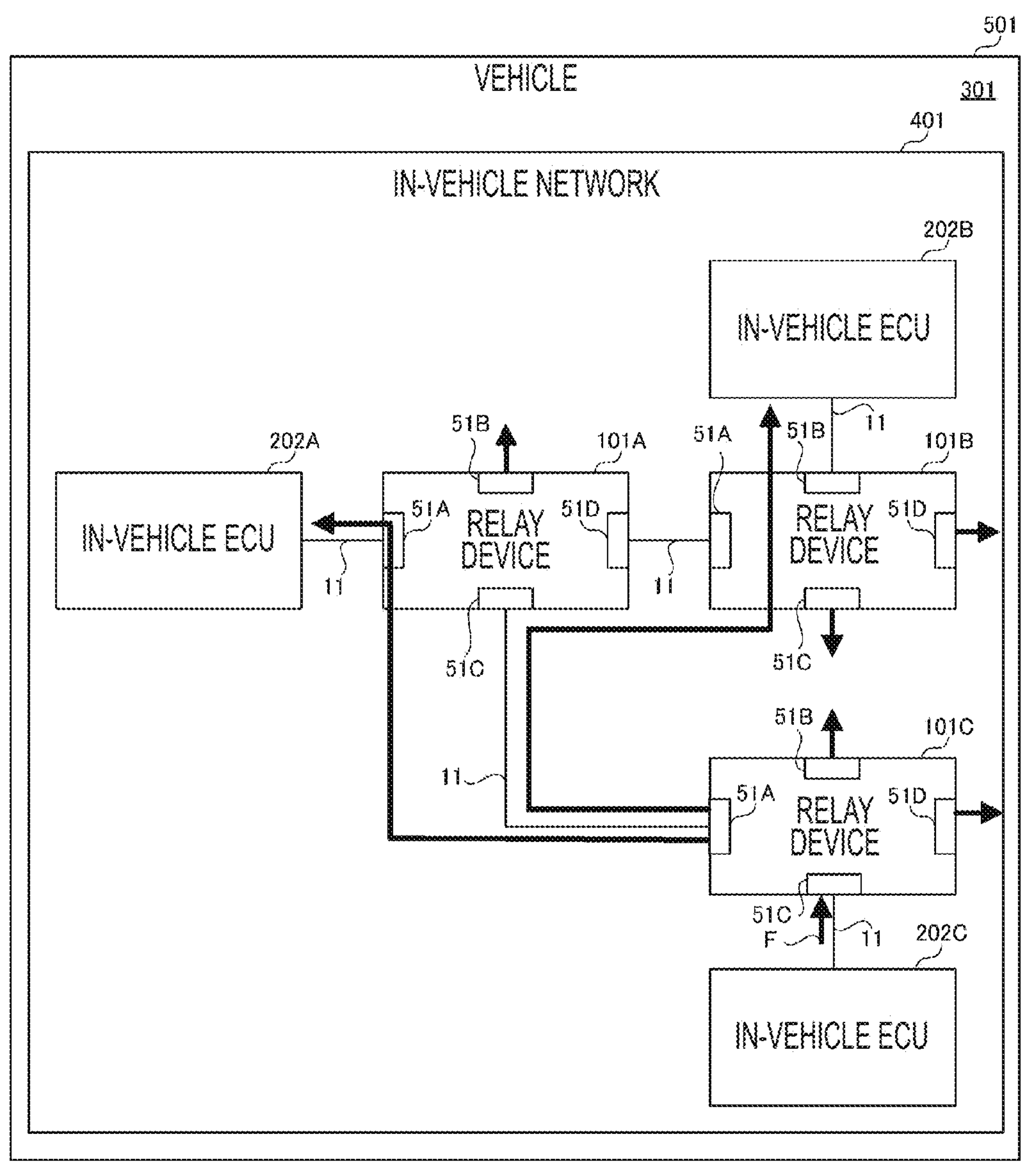
FIG. 5 is a diagram showing an example of relay of frames when table update processing is performed in the in-vehicle communication system according to the embodiment of the present disclosure.

FIG. 5 is a diagram showing an example of relay of frames when table update processing is performed in the in-vehicle communication system according to the embodiment of the present disclosure.

Referring to FIGS. 2 and 5, the in-vehicle ECU 202C broadcasts the frame F. The relay devices 101 transmit the frame F from all the communication ports 51 other than the communication port 51 at which the frames F was received. That is, the relay devices 101 flood the frames F. As a result, the in-vehicle ECUs 202A and 202B receive the frames F from the in-vehicle ECU 202C via the relay devices 101.

The in-vehicle ECU 202C may broadcast, as the frames F, frames that store a message compliant with an existing protocol for establishing communication connection with other in-vehicle ECUs 202A and 202B.

For example, the in-vehicle ECU 202C may broadcast a DHCP request frame as the frame F complaint with DHCP (Dynamic Host Configuration Protocol). Further, the in-vehicle ECU 202C may broadcast a frame in which the Offer message is stored as the frame F complaint with SOME/IP which is a protocol of an application layer of the Ethernet protocol group.

The frames F are not limited to frames compliant with an existing protocol, and may be frames dedicated for the table update processing.

In addition, the in-vehicle ECU 202C is not limited to a configuration in which the frames F are broadcast, and may be a configuration in which the frame F is multicast or unicast.

In addition, when a change in the state of the in-vehicle network 401 is detected by the state monitoring unit 55, the switching unit 56 may transmit a frame request notification for requesting transmission of the frame F to the in-vehicle ECU 202C via the relay unit 52. The in-vehicle ECU 202C transmits a frame F including its source MAC address to the relay device 101C as a response to the frame request notification.

Referring to FIGS. 2 and 5, upon receiving the frame F from the in-vehicle ECU 202C, the relay unit 52 in the relay device 101C outputs the received frame F to the update unit 54, and notifies the update unit 54 of the port number at which the frame F is received.

The update unit 54 in each relay device 101 refers to the table T stored in the storage unit 53, and performs table update processing using the received frame F.

The update unit 54 learns the correspondence relationship between the destination MAC address included in the frame addressed to the in-vehicle ECU 202C and the port number. More specifically, in the execution state, the update unit 54 reads the source MAC address included in the received frame F, and registers the correspondence relationship between the read source MAC address and the port number received from the relay unit 52 in the table T as the correspondence relationship between the destination MAC address included in the frame addressed to the in-vehicle ECU 202C and the communication port 51 to which the frame is to be output.

Note that, the update unit 54 is not limited to a configuration in which the table update processing is performed based on the frame F transmitted from the in-vehicle ECU 202C that caused the change. For example, the update unit 54 may perform the table update processing based on the correspondence relationship between the MAC addresses of the in-vehicle ECUs 202 that can be added and the communication ports 51, which is saved in advance in the storage unit 53.

The saving unit 57 saves the table T updated in the execution state in the storage unit 53. More specifically, the saving unit 57 saves the table T including the correspondence relationship learned by the update unit 54 in the storage unit 53.

FIG. 6 is a diagram illustrating an example of tables in the execution state of the in-vehicle communication system according to the embodiment of the present disclosure.

Referring to FIG. 6, the correspondence relationship between the destination MAC address "MAC-C" and the port numbers obtained in the execution state of the table update processing are newly registered in the tables Ta, Tb, and Tc.

For example, in the table Ta, the destination MAC address "MAC-C" and the port number "#2" are associated with each other. In the table Tb, the destination MAC address "MAC-C" and the port number "#1" are associated with each other. In the table Tc, the destination MAC address "MAC-C" and the port number "#3" are associated with each other.

Referring to FIGS. 4 and 6, tables Ta, Tb, and Tc include distinction information in addition to the correspondence relationship between the destination MAC addresses and the port numbers. The distinction information indicates whether each of the correspondence relationships included in the tables Ta, Tb, and Tc is the correspondence relationship registered in the past execution state or the correspondence relationship registered in the current execution state.

More specifically, "stopped" in the "distinction information" indicates that the correspondence relationship registered in the table Ta, Tb, or Tc is the correspondence relationship registered in the past execution state. That is, "stopped" indicates that registration was performed by switching from the execution state to the stopped state in the past table update processing.

"Execution" in the "distinction information" indicates that the correspondence relationship registered in the table Ta, Tb, or Tc is the correspondence relationship registered in the current execution state.

As shown in FIG. 4, in the tables Ta, Tb, and Tc saved in the storage unit 53 of each relay device 101 in the existing network, "stopped" is set as the "distinction information" of all the correspondence relationships.

In FIG. 6 showing the tables Ta, Tb, and Tc in the execution state, as compared with FIG. 4, the correspondence relationship between the destination MAC address "MAC-C" and the port number is newly registered, and "execution" is set as the "distinction information" of the correspondence relationship.

FIG. 7 is a diagram illustrating an example of a table after the in-vehicle communication system according to the embodiment of the present disclosure is switched to the stopped state.

For example, when a predetermined period of time has elapsed after switching to the execution state, the switching unit 56 switches to the stopped state.

When the execution state is switched to the stopped state by the switching unit 56, the saving unit 57 saves the tables Ta, Tb, and Tc updated in the execution state in the storage unit 53 as the tables Ta, Tb, and Tc to be used for the relay processing in the stopped state.

More specifically, referring to FIGS. 2 and 7, when the switching unit 56 switches from the execution state to the stopped state, the saving unit 57 changes the distinction information of the correspondence relationship between the destination MAC address "MAC-C" and the port number in the tables Ta, Tb, and Tc from "execution" to "stopped", and saves the distinction information in the storage unit 53. That is, each relay device 101 statically holds the updated table T. Accordingly, for example, since the correspondence relationship in which "MAC-C" is the destination MAC address is held without being cleared, the relay device 101 can specify the port number corresponding to the unicast frame when receiving the unicast frame addressed to the in-vehicle ECU 202C. Therefore, it is possible to suppress the occurrence of flooding in in-vehicle network 401.

For example, when the relay device 101 switches from the stopped state to the execution state again after saving the updated table T in the storage unit 53, the relay device 101 performs the frame relay processing using the previously updated table T until the table Tis newly updated in the execution state.

The switching unit 56 may switch to the stopped state when some event occurs after switching to the execution state. For example, in the execution state, when the switching unit 56 receives a notification indicating that the registration of the correspondence relationship and the setting of the distinction information by the update unit 54 are completed, the switching unit 56 may switch to the stopped state.

Further, the saving unit 57 may be configured not to register the distinction information of the correspondence relationships in the table T. In this case, for example, the relay device 101 may transmit a notification for requesting a predetermined frame to all the in-vehicle ECUs 202 in the execution state, and update the table T based on the frame received from each of the in-vehicle ECUs 202.

Operation Flow

Figure 8:
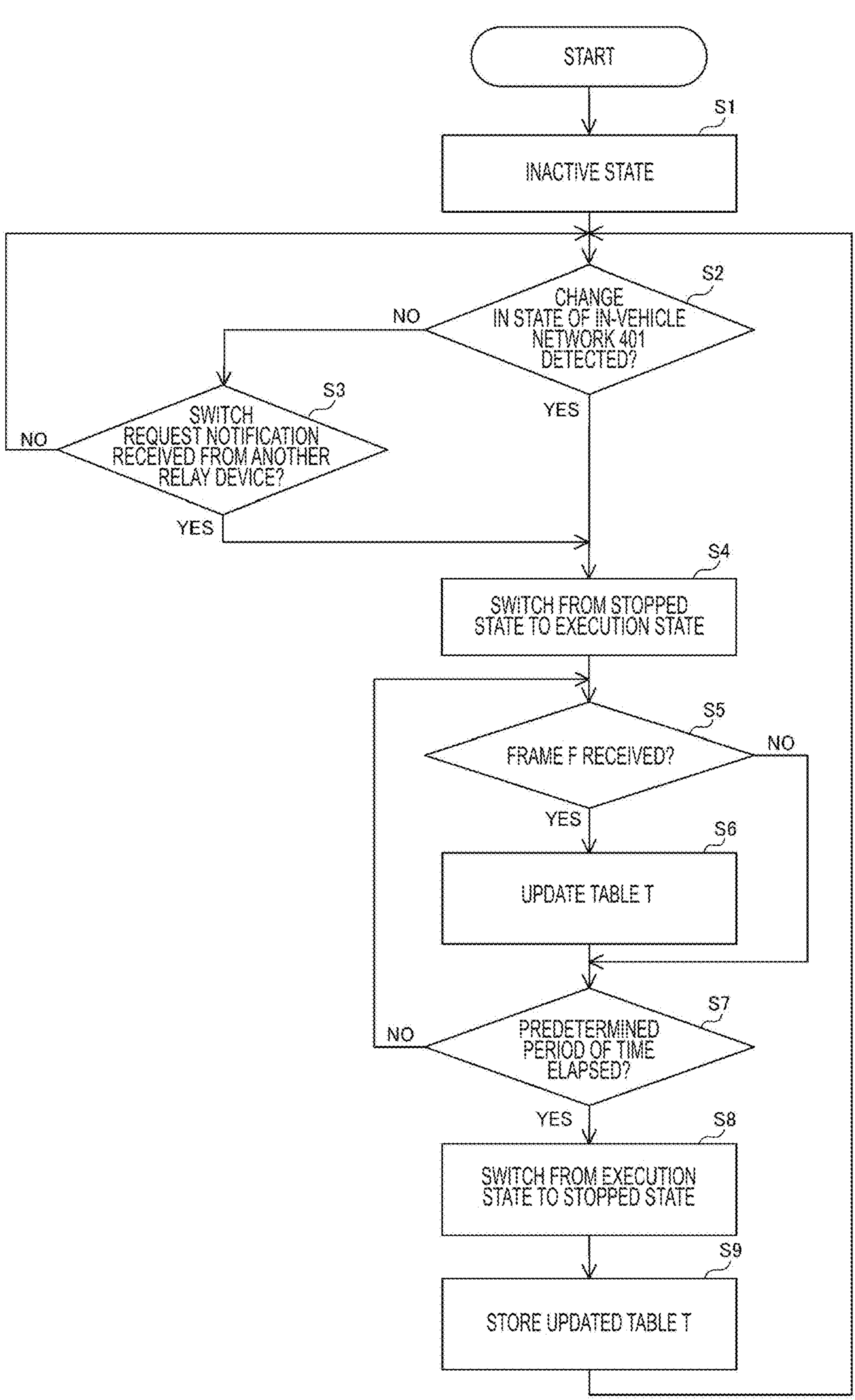
FIG. 8 is a diagram showing a flowchart defining an operation procedure when executing the table update processing performed by the relay device in the in-vehicle communication system according to the embodiment of the present disclosure.

FIG. 8 is a diagram showing a flowchart defining an operation procedure when the relay device in the in-vehicle communication system according to the embodiment of the present disclosure executes the table update processing.

Referring to FIG. 8, first, the relay device 101 maintains the stopped state (step S1) until a change in the state of the in-vehicle network 401 is detected (NO in step S2) or a switching request notification is received from another relay device 101 (NO in step S3). Here, it is assumed that the relay device 101 detects the addition of a new functional unit as a change in the state of the in-vehicle network 401.

Next, when the relay device 101 detects the change (YES in step S2) or receives a switching request notification from the other relay device 101 (YES in step S3), the relay device 101 switches from the stopped state to the execution state (step S4).

Next, upon receiving the frame F from the new functional unit (YES in step S5), the relay device 101 refers to the table T in the storage unit 53 and updates the table T using the received frame F.

Specifically, as described above, the relay device 101 newly registers the correspondence relationship between the source MAC address included in the received frame F and the communication port 51 at which the frame F was received in the table T as the correspondence relationship between the destination MAC address included in the frame addressed to the new functional unit and the communication port 51 to which the frame is to be output. Also, the relay apparatus 101 sets "execution" as the distinction information of the correspondence relationship in the table T. When the correspondence relationship corresponding to the frame F has been already registered in the table T, the relay device 101 does not update the table T (step S6).

Next, the relay device 101 waits for the frame F until a predetermined period of time elapses after switching to the execution state (NO in step S7), and when the predetermined period of time has elapsed (YES in step S7), switches to the stopped state (step S8).

Next, the relay device 101 saves the table T that was updated in the execution state as the table T used for the relay processing in the stopped state. As shown in FIG. 7 above, the relay device 101 saves the table T in which the distinction information of the newly registered correspondence relationship was changed from "execution" to "stopped" (step S9).

Figure 9:
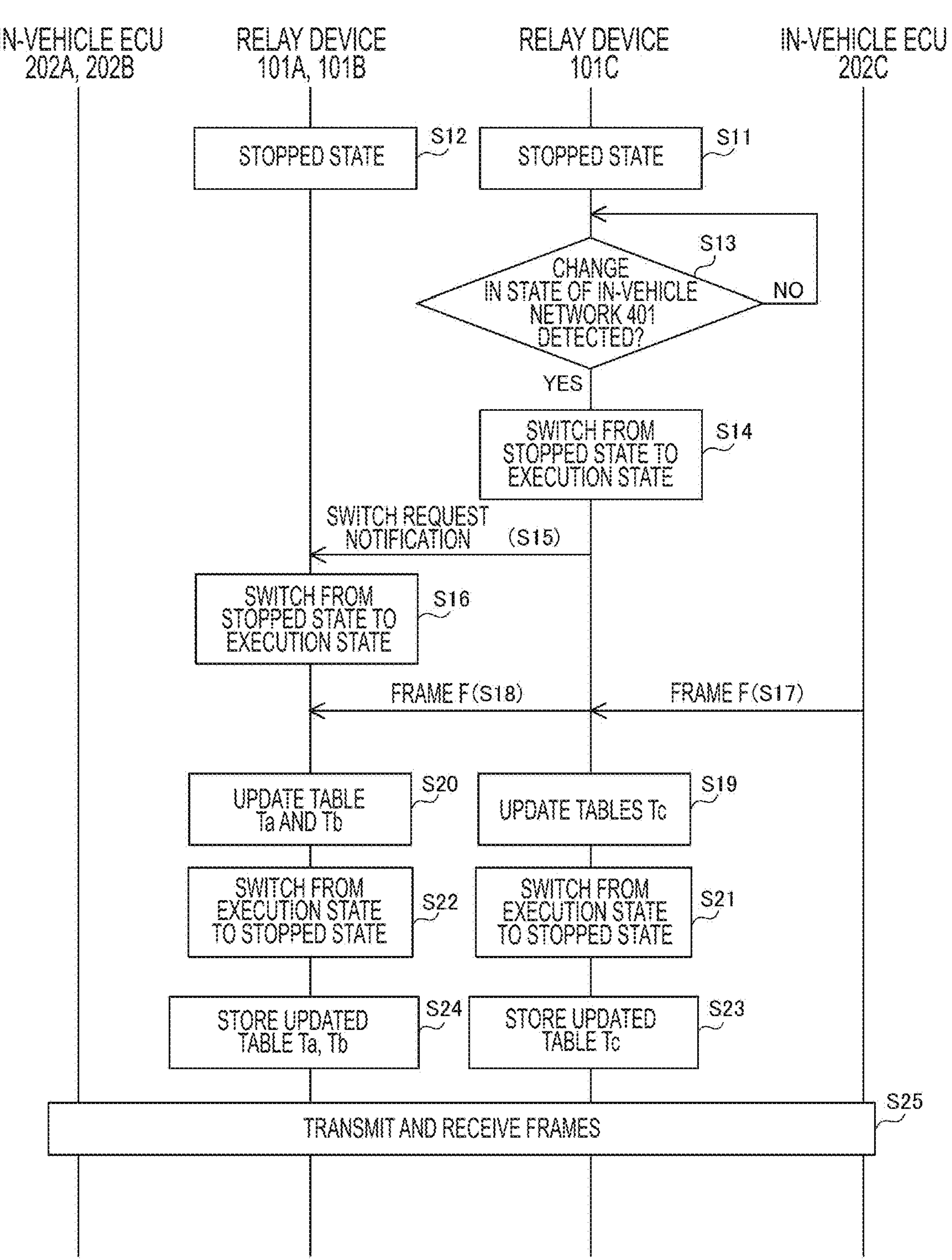
FIG. 9 is a diagram showing a sequence of relay processing in the in-vehicle communication system according to the embodiment of the present disclosure.

FIG. 9 is a diagram showing a sequence of the relay processing in the in-vehicle communication system according to the embodiment of the present disclosure.

Referring to FIG. 9, first, until a change in the in-vehicle network 401 is detected (NO in step S13), the relay device 101C maintains the stopped state (step S11). Here, it is assumed that the relay device 101C detects addition of the in-vehicle ECU 202C to the in-vehicle network 401 as the change in the state of the in-vehicle network 401.

Next, when the change is detected (YES in step S13), the relay device 101C switches from the stopped state to the execution state (step S14).

Next, the relay device 101C transmits a switching request notification to the relay devices 101A and 101B (step S15).

Next, upon receiving the switching request notification from the relay device 101C in the stopped state (step S12), the relay devices 101A and 101B switch from the stopped state to the execution state (step S16).

Next, the in-vehicle ECU 202C transmits the frame F to the relay device 101C (step S17).

Next, upon receiving the frame F from the in-vehicle ECU 202C, the relay device 101C transmits the received frame F to the relay devices 101A and 101B (step S18).

Next, the relay device 101C refers to the table Tc in the storage unit 53, and updates the table Tc using the received frame F. Also, upon receiving the frame F from the relay device 101C, the relay devices 101A and 101B refer to the tables Ta and Tb in the storage unit 53 and update the tables Ta and Tb using the received frame F.

Specifically, as described above, each relay device 101 newly registers the correspondence relationship between the source MAC address included in the received frame F and the communication port 51 at which the frame F was received in the table T as the correspondence relationship between the destination MAC address included in the frame addressed to the new functional unit and the communication port 51 to which the frame is to be output. In addition, each relay device 101 sets "execution" as the distinction information of the correspondence relationship in the table T (steps S19 and S20).

Next, for example, when a predetermined period of time has elapsed, each relay device 101 is switched to the stopped state (steps S21 and S22).

Next, each relay device 101 saves the table T updated in the execution state as the table T to be used for the relay processing in the stopped state. Specifically, as illustrated in FIG. 7 described above, each relay device 101 changes the distinction information of the newly registered correspondence relationship from "execution" to "stopped" in the table T (steps S23 and S24).

Next, the in-vehicle ECUs 202 in the in-vehicle communication system 301 transmit and receive the frames to and from the other in-vehicle ECUs 202 via the relay devices 101 (step S25).

The steps of the processing (functions) of the above-described embodiment are realized by a processing circuit including one or a plurality of processors. The processing circuit may include, in addition to the one or a plurality of processors, one or a plurality of memories, an integrated circuit in which various analog circuits and various digital circuits are combined, and the like. The one or a plurality of memories store a program (instructions) that causes the one or a plurality of processors to execute the processing. The one or a plurality of processors may execute the processing in accordance with the program read from the one or a plurality of memories, or may execute the processing in accordance with a logic circuit designed in advance to execute the processing. The processor may be various processors suitable for control of a computer, such as a central processing unit (CPU), a graphics processing unit (GPU), a digital signal processor (DSP), a field programmable gate array (FPGA), and an application specific integrated circuit (ASIC). Note that the plurality of physically separated processors may execute the processing in cooperation with each other. For example, the processors mounted in a plurality of physically separated computers may execute the processing in cooperation with each other via a network such as a local area network (LAN), a wide area network (WAN), or the Internet. The program may be installed in the memory from an external server device or the like via the network, or may be distributed in a state of being stored in a recording medium such as a Compact Disc Read Only Memory (CD-ROM), a Digital Versatile Disk Read Only Memory (DVD-ROM), or a semiconductor memory, and installed in the memory from the above recording medium.

It should be appreciated that the embodiment disclosed herein are illustrative in all respects, and should not be considered restrictive. The scope of the present disclosure is defined by the claims, and is intended to encompass all modifications within the meaning and scope equivalent to the claims.

The above description includes the following features.

Supplementary Note 1

A relay device configured to perform relay processing of a frame between a plurality of functional units in an in-vehicle network, the relay device including:

- a plurality of communication ports,
- a storage unit configured to store correspondence information that is used for the relay processing and indicates a correspondence relationship between a destination MAC address included in the frame and the communication ports,
- a state monitoring unit configured to monitor a state of the in-vehicle network,
- an update unit configured to perform update processing of the correspondence information, and
- a switching unit configured to switch between a stopped state in which the update processing is stopped and an execution state in which the update processing is executed, and to switch from the stopped state to the execution state when a change in a state of the in-vehicle network is detected by the state monitoring unit, and
- a saving unit configured to save the correspondence information, on which the update processing has been performed in the execution state, in the storage unit, as the correspondence information to be used for the relay processing in the stopped state, when the switching unit switches from the execution state to the stopped state,
- wherein the saving unit saves, in the storage unit, distinction information indicating whether the correspondence relationship is a correspondence relationship registered in a past execution state or a correspondence relationship registered in a current execution state.

Supplementary Note 2

A relay device configured to perform relay processing of a frame between a plurality of functional units in an in-vehicle network, the relay device including:

- a plurality of communication ports,
- a storage unit configured to store correspondence information to be used for the relay processing, the correspondence information indicating a correspondence relationship between a destination MAC address included in the frame and the communication ports, and
- a processing circuit,
- wherein the processing circuit is configured to:
  - monitor a state of the in-vehicle network, and
  - switch from a stopped state in which the update processing of the correspondence information is stopped to an execution state in which the update processing is executed when a change in the state of the in-vehicle network is detected,
  - perform the update processing of the correspondence information in the execution state, and
  - save the correspondence information on which the update processing is performed in the execution state in the storage unit as the correspondence information to be used for the relay processing in the stopped state when the execution state is switched to the stopped state.

The invention claimed is:

1. A relay device configured to perform relay processing of a frame between a plurality of functional units in an in-vehicle network, the relay device comprising:

- a plurality of communication ports;
- a memory configured to store correspondence information that is used for the relay processing and indicates a correspondence relationship between a destination media access control address included in the frame and the communication ports; and
- a processor that is configured to:
  - monitor a state of the in-vehicle network;
  - perform update processing of the correspondence information;
  - switch between a stopped state in which the update processing is stopped and an execution state in which the update processing is executed, and to switch from the stopped state to the execution state when a change in the state of the in-vehicle network is detected; and
  - save, in the memory, the correspondence information on which the update processing is performed in the execution state as the correspondence information to be used for the relay processing in the stopped state, when the processor switches from the execution state to the stopped state.

2. The relay device according to claim 1, wherein the change is an addition of an additional functional unit to the in-vehicle network.

3. The relay device according to claim 2, wherein the processor is configured to:

detect the change due to the additional functional unit, perform the update processing based on a predetermined frame transmitted from the additional functional unit that caused the change, and transmit the predetermined frame to another relay device in the in-vehicle network.

4. The relay device according to claim 3, wherein the processor is configured to save distinction information indicating whether the correspondence relationship is a correspondence relationship registered in a past execution state or a correspondence relationship registered in a current execution state, in the memory.

5. The relay device according to claim 2, wherein the processor switches from the execution state to the stopped state when a predetermined period of time has elapsed after switching to the execution state.

6. The relay device according to claim 2, wherein the processor is configured to save distinction information indicating whether the correspondence relationship is a correspondence relationship registered in a past execution state or a correspondence relationship registered in a current execution state, in the memory.

7. The relay device according to claim 1, wherein the processor switches from the execution state to the stopped state when a predetermined period of time has elapsed after switching to the execution state.

8. The relay device according to claim 7, wherein the processor is configured to save distinction information indicating whether the correspondence relationship is a correspondence relationship registered in a past execution state or a correspondence relationship registered in a current execution state, in the memory.

9. The relay device according to claim 1, wherein the processor is configured to save distinction information indicating whether the correspondence relationship is a correspondence relationship registered in a past execution state or a correspondence relationship registered in a current execution state, in the memory.

10. A relay method to be performed by a relay device configured to perform relay processing of a frame between a plurality of functional units in an in-vehicle network and including a plurality of communication ports and a memory configured to store correspondence information that is used for the relay processing and indicates a correspondence relationship between a destination media access control address included in the frame and the communication ports, the method comprising:

monitoring a state of the in-vehicle network;

switching between a stopped state in which update processing is stopped and an execution state in which the update processing is executed, when a change in the state of the in-vehicle network is detected;

performing the update processing in the execution state; and saving, in the memory, the correspondence information on which the update processing is performed in the execution state, as correspondence information to be used for the relay processing in the stopped state, when switching from the execution state to the stopped state.

11. A storage medium that stores a relay program to be used in a relay device configured to perform relay processing of a frame between a plurality of functional units in an in-vehicle network and including a plurality of communication ports and a memory configured to store correspondence information that is used for the relay processing and indicates a correspondence relationship between a destination media access control address included in the frame and the communication ports, the relay program causing a processor to:

monitor a state of the in-vehicle network;

perform update processing of the correspondence information;

switch between a stopped state in which the update processing is stopped and an execution state in which the update processing is executed, and to switch from the stopped state to the execution state when a change in the state of the in-vehicle network is detected; and store, in the memory, the correspondence information on which the update processing is performed in the execution state, as the correspondence information to be used for the relay processing in the stopped state, when the processor switches from the execution state to the stopped state.

* * * * *